US012330922B2

(12) United States Patent
Beyer

(10) Patent No.: US 12,330,922 B2
(45) Date of Patent: Jun. 17, 2025

(54) LIFT SYSTEM

(71) Applicant: Ryan Scott Beyer, Durango, CO (US)

(72) Inventor: Ryan Scott Beyer, Durango, CO (US)

( * ) Notice: Subject to any disclaimer, the term of this patent is extended or adjusted under 35 U.S.C. 154(b) by 205 days.

(21) Appl. No.: 18/073,765

(22) Filed: Dec. 2, 2022

(65) Prior Publication Data

US 2024/0182275 A1 Jun. 6, 2024

(51) Int. Cl.
*B66C 25/00* (2006.01)
*B66C 1/02* (2006.01)

(52) U.S. Cl.
CPC ............ *B66C 25/00* (2013.01); *B66C 1/0243* (2013.01)

(58) Field of Classification Search
CPC ....... B66C 25/00; B66C 1/0243; B66C 5/025; B66D 3/04; B66D 3/14; B66D 2700/02; B66D 2700/023; B66D 2700/026
See application file for complete search history.

(56) References Cited

U.S. PATENT DOCUMENTS

| | | | | |
|---|---|---|---|---|
| 4,660,679 A * | 4/1987 | Ostrobrod | B66C 5/025 116/202 |
| 4,690,248 A * | 9/1987 | Killeen | E06C 1/39 182/27 |
| 5,303,899 A * | 4/1994 | Palya | B66C 5/025 414/11 |
| 8,225,906 B2 | 7/2012 | Kieffer et al. | |
| 8,651,259 B1 | 2/2014 | Blehm | |
| 2001/0032972 A1 * | 10/2001 | Fillisetti | B66C 5/025 254/334 |
| 2009/0095944 A1 * | 4/2009 | Gaines | B66C 23/005 254/334 |
| 2018/0363371 A1 | 12/2018 | Huckabay | |
| 2022/0348442 A1 * | 11/2022 | Winters | B66C 5/025 |

FOREIGN PATENT DOCUMENTS

| | | | |
|---|---|---|---|
| CN | 108706489 A * | 10/2018 | |
| FR | 2922541 A1 * | 4/2009 | B66C 5/025 |
| GB | 2484544 A * | 4/2012 | B66C 1/0212 |

OTHER PUBLICATIONS

FastTool Now. Wood's Powr-Grip 97920MA Ladder Lift LL185w/ VL2 Handcup Frame & N4000 Handcups. Website, https://fasttoolnow.com, originally downloaded Nov. 15, 2022, 4 total pages.

PCT International Patent Application No. PCT/US23/82031, International Search Report and Written Opinion of the International Searching Authority dated May 2, 2024, 13 pages.

* cited by examiner

*Primary Examiner* — Emmanuel M Marcelo

(74) *Attorney, Agent, or Firm* — Craig R. Miles; CR MILES P.C.

(57) ABSTRACT

Generally, a transportable lift system operable to capture and raise materials from a first height to a second height. Specifically, a lift having first and second length adjustable supports having second ends pivotally coupled to allow opposite first ends to be secured to a surface a distance apart to allow a line pay-out device coupled to the first length adjustable support to pay out a line proximate the first length adjustable support second end, whereby materials attached to the line can be raised from a first height to a second height.

17 Claims, 8 Drawing Sheets

LIFT SYSTEM

I. FIELD OF THE INVENTION

Generally, a transportable lift system operable to capture and raise materials from a first height to a second height. Specifically, a lift having first and second length adjustable supports having second ends pivotally coupled to allow opposite first ends to be secured to a surface a distance apart to allow a line pay-out device coupled to the first length adjustable support to pay out a line proximate the first length adjustable support second end, whereby materials attached to the line can be raised from a first height to a second height.

II. BACKGROUND OF THE INVENTION

It can be challenging to move materials from ground height during construction or maintenance of a building. As one illustrative example, the recent interest in contemporary architecture, particularly in connection with residential buildings, has resulted in a substantial increase in the demand for installation of cement roofing tiles and/or skylights on building roofs. The movement of heavy roofing tiles and skylights and their installation can be challenging.

In the first instance, installing roofing materials and skylights at roof height poses a fall risk. Additionally, the roof pitch, which in certain instances may be near zero degrees, may also be at an extreme pitch approaching 70 degrees. Labor on a pitched surface poses an increased fall hazard.

In the second instance, skylights are not readily moved to the skylight opening for installation. In the case of rectangular fixed or vented skylights with flat tempered glass, standard sizes can vary from 14 inches to 72 inches in width and from 16 inches to 96 inches in length. The glass thickness of an average skylight can be one-eight inch to one-quarter inch, generally increasing in thickness with increased size of the skylight. Typically, two tempered glass panes are utilized to increase energy efficiency, rather than a single thick piece of glass. One-eighth inch glass typically weighs about 1.5 pounds per square foot and one-quarter inch glass weighs about 3.2 pounds per square foot. Accordingly, where two tempered glass panes are used, the glass in the skylight will weigh in the range of 3.0 pounds per square foot and 6.4 pounds per square foot. Thus, glass in a standard sized skylight may weigh in the range of about 4.5 pounds to about 300 pounds not including the additional weight of the skylight frame which supports the glass.

Accordingly, one or more installers stand inside the building with the skylight, lift it up through the skylight opening to one or more installers on the building roof. The one or more installers on the roof rests the bottom edge of the skylight against the sill and lowers the skylight onto the roof over the skylight opening.

There would be a substantial advantage in a transportable lift system which can be configured to mount on the building roof to lift materials to roof height or lift a skylight through the skylight opening and assist in placement of the skylight on the roof over the skylight opening to reduce one or more of: installation labor, fall risk to the installers, damage to the skylight and/or the building.

III. SUMMARY OF THE INVENTION

A broad object of particular embodiments of the invention can be to provide a lift mountable on structure including one or more of: a first length adjustable support having a first end opposite a second end with a line pay-out support disposed proximate the second end, and a first mount coupled to the first length adjustable support first end configured to secure to a surface of a structure; a second length adjustable support having a first end opposite a second end, and a second mount coupled the second length adjustable support first end configured to secure to the surface of the structure, the second length adjustable support second end pivotally coupled to the first length adjustable support; a line pay-out device coupled to the first length adjustable support, the line pay-out device operable to adjust a length of a line supported by the line pay-out support disposed proximate the first length adjustable support second end; and a material capture assembly attached to the line, and optionally a panel capture assembly attached to the line configured to couple to a panel, the length of the line adjustable by operation of the line pay-out device to lift the material or panel coupled to the material capture assembly or panel capture assembly.

Another broad object of particular embodiments of the invention can be to provide a method of making a lift mountable on a structure including one or more of: producing a first length adjustable support having a first end opposite a second end; coupling a first mount to a first length adjustable support first end, the first mount configured to mount to a surface of a structure; coupling a line pay-out support to the first length adjustable support; producing a second length adjustable support having a first end opposite a second end; coupling a second mount to the second length adjustable support first end, the second mount configured to secure to the surface of the structure; coupling a line pay-out device to said first length adjustable support, the line pay-out device operable to adjust a length of a line supported by a line pay-out support disposed proximate the first length adjustable support second end; and attaching material capture assembly, or optionally, a panel capture assembly, to the line, wherein the panel capture assembly configured to couple to a panel, the length of the line adjustable by operation of the line pay-out device to lift material, or optionally, a panel coupled to the panel capture assembly.

Another broad object of particular embodiments of the invention can be to provide a method of using a lift mountable on a structure. The method including: one or more of disposing a lift on a surface of the structure, wherein the lift includes one or more of: a first length adjustable support having a first end opposite a second end with a line pay-out support coupled proximate the first length adjustable support second end, a first mount coupled to the first length adjustable support first end said first mount configured to secure to a surface; a second length adjustable support having a first end opposite a second end, and a second mount coupled to the second length adjustable support first end, said second mount configured to secure to the surface of the structure, the second end of the second length adjustable support pivotally coupled to the first length adjustable support second end; a line pay-out device coupled to the first length adjustable support, the line pay-out device operable to adjust a length of a line supported by the line pay-out support; and a material capture assembly, or optionally a panel capture assembly, attached to the line, the panel capture assembly configured to couple to a panel, the length of the line adjustable by operation of the line pay-out device to lift material, or optionally a panel, coupled to the panel capture assembly. The method further including one or more of: securing the first mount coupled to the first length adjustable support first end to the surface of the structure; adjusting length of the first length adjustable support; pivotally rotating a second length adjustable support in relation to the first length adjustable support; adjusting length of said second length adjustable support; securing the second mount coupled to second length adjustable support first end to the surface of the structure; operating the line pay-out device to adjust a length of the line supported by the line pay-out support; capturing material with the material capture assembly, or optionally, capturing a panel with said panel capture assembly; and lifting the material, or optionally, the panel by operation of said line pay-out device from a first height to second height.

Naturally, further objects of the invention are disclosed throughout other areas of the specification, drawings, photographs, and claims.

IV. BRIEF DESCRIPTION OF THE DRAWINGS

V. DETAILED DESCRIPTION OF THE INVENTION

Figure 1:
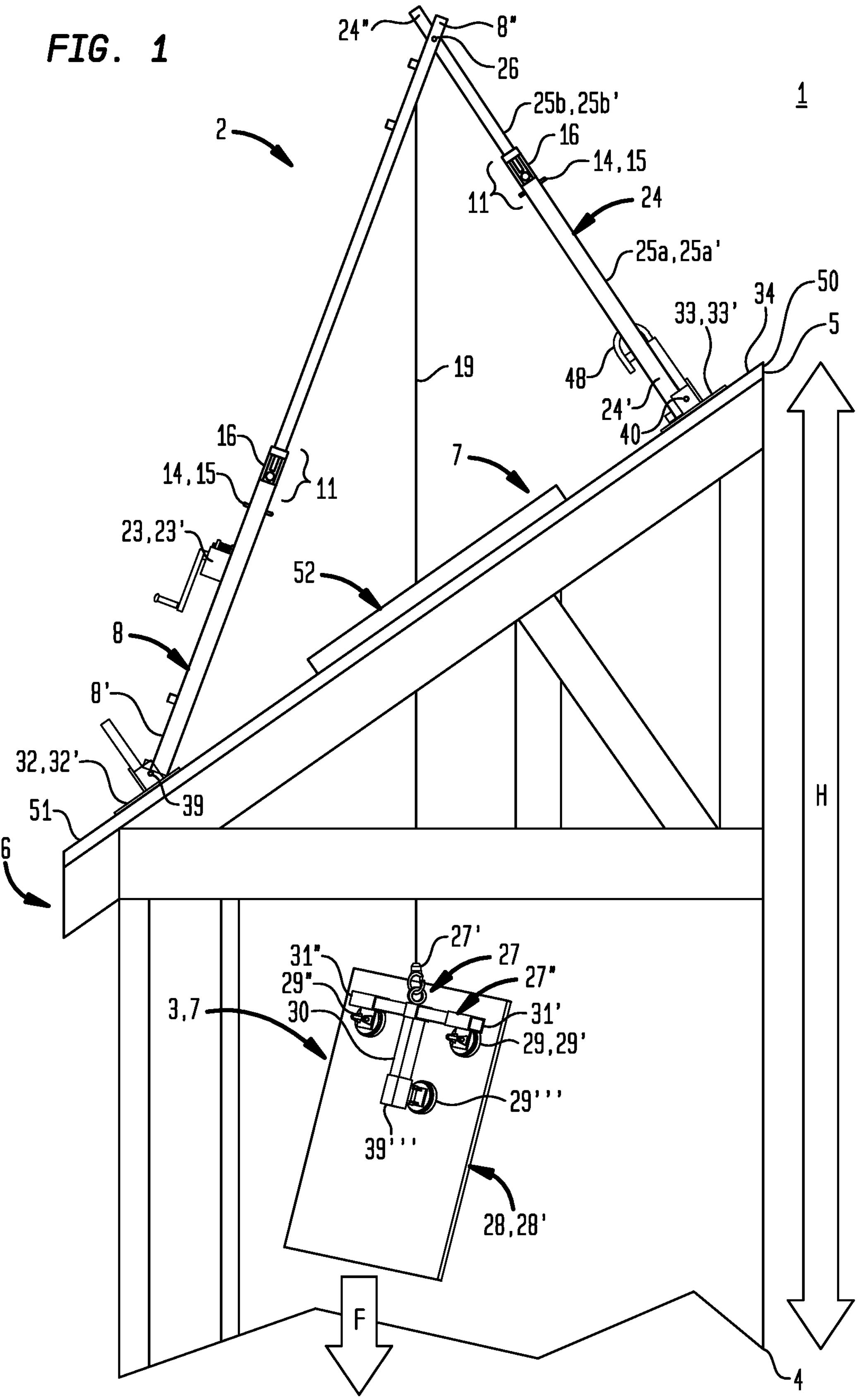
FIG. 1 is an illustration of a method of using a particular embodiment of the inventive lift to raise material from a first height to a second height.

Generally, referring to FIGS. 1 through 8, the invention includes embodiments of a lift system (1) including embodiments of a lift (2), a method of making embodiments of the lift (2), and methods of using the lift (2) to move a load (3). Specifically, the lift system (1) can assist in raising or lowering a load (3) from a first height (4) to a second height (5) in the construction or maintenance of structures or buildings (6). The term "load" broadly encompasses any weight of an object(s) that generate in part a vertical force (F) that can be resisted, raised or lowered over a height (H) by embodiments of the inventive lift (2). As an illustrative example, the load (3) can comprise any one or more of objects, devices, materials, panels, or skylights (collectively "materials" (7)) that can be lowered or lifted in construction of a building (6), to retrofit an existing building (6), or in replacement of existing skylights (7) in a building (6).

Figure 2:
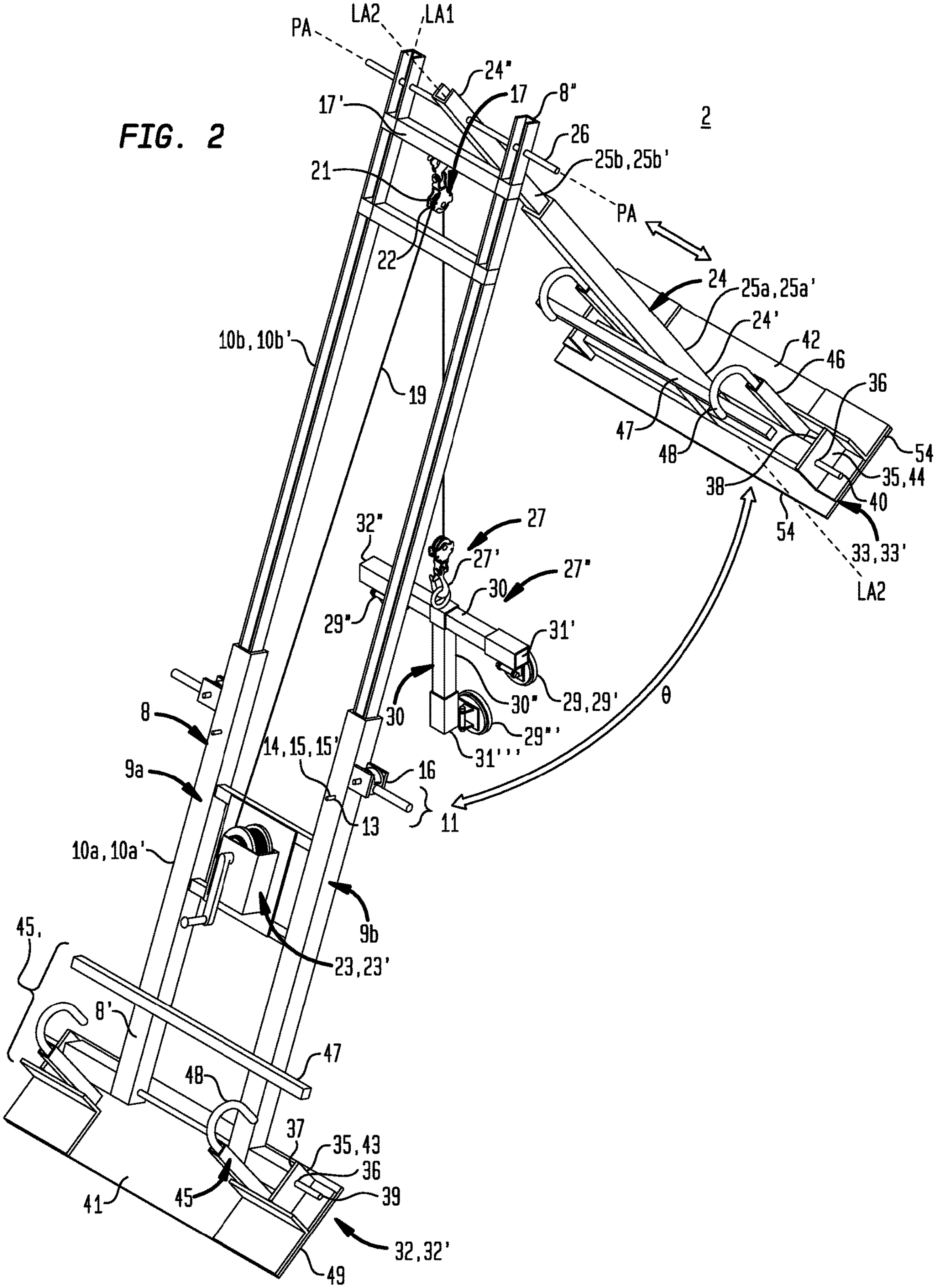
FIG. 2 is a perspective view of a particular embodiment of the inventive lift.

Now, with primary reference to FIGS. 2 through 8, in particular embodiments, the lift (2) can include first length adjustable support (8) having a first length adjustable support first end (8') opposite a first length adjustable support second end (8"). The first length adjustable support (8) can include a pair of length adjustable support members (9*a*, 9*b*) disposed in fixed spaced apart relation; however, this is not intended to preclude embodiments of the first length adjustable support (8) that may include only one length adjustable support (9*a*). The pair of length adjustable support members (9*a*, 9*b*) can each include a first member (10*a*) configured to slidably axially adjustably engage a second member (10*b*). As an illustrative example, the pair of length adjustable support members (9*a*, 9*b*) can, but need not necessarily, each include an inner telescoping member (10*b*') axially adjustable in an outer telescoping member (10*a*'). The illustrative example of a pair of telescoping members (10*a*', 10*b*') is not intended to preclude embodiments which a greater number of telescoping members comprise each length adjustable member (9*a*, 9*b*). The inner telescoping member (10*b*') and the outer telescoping member (10*a*') can in cross section perpendicular to the longitudinal axis (LA1) of a length adjustable support members (9*a* or 9*b*) each define a square tube, or as shown in the example of FIG. 2 define a channel, such as a metal U-channel, telescoping inside a square tube; however, this is not intended to preclude configurations of the inner telescoping member (10*b*') and the outer telescoping member (10*a*') which in the cross section perpendicular to the longitudinal axis (LA1) defines a rectangle, circle, oval, or other cross section configuration in which an inner telescoping member (10*b*') slidably engages the outer telescoping member (10*a*') to allow axial slidably adjustment of the outer telescoping member (10*a*') in relation to the inner telescoping member (10*b*'). The first member (10*a*) and the second member (10*b*) can each be formed from one or more of: a metal, such as: steel, aluminum, magnesium, titanium, beryllium and alloys, or combinations thereof; a fiber glass; or a plastic, or combinations thereof.

Again, with primary reference to FIGS. 1 through 8, in particular embodiments a lock mechanism (11) can be associated with the inner telescoping member (10*b*') or the outer telescoping member (10*a*') to releasably lock the inner telescoping member (10*b*') in axial relation to the outer telescoping member (10*a*'). As shown in the illustrative example of FIG. 3, one or more of a first plurality of apertures (12) in the inner telescoping member (10*a*') can be axially aligned with one or more of a second plurality of apertures (13) in the outer telescoping member (10*a*'). One or more pins (14) can be inserted into the aligned apertures (12, 13) of the inner telescoping member (10*b*') and the outer telescoping member (10*a*') to fix the inner telescoping member (10*b*') in axial spatial relation to the outer telescoping member (10*a*'). However, this illustrative example is not intended to preclude other embodiments of the lock mechanism (11). As one example, the lock mechanism (11) can comprise a spring detent (15) positioned in an inner telescoping member (10*b*') with a button (15') extending through one of the first plurality of apertures (12) in the inner telescoping member (10*a*'). The outer telescoping member (10*b*') can have one of the second plurality of apertures (13) configured to receive the button (15') of the spring detent (15) to axially fix the inner telescoping member (10*b*') in relation to the outer telescoping member (10*a*'). As another illustrative example, the lock mechanism (11) can comprise a cam member (16) (as shown in the example of FIG. 2) pivotally coupled to the outer telescoping member (10*a*') to allow rotation of the cam member (16) through an opening in said outer telescoping member (10*a*') to apply urging pressure to the inner telescoping member (10*b*') sufficient to fix the inner telescoping member (10*b*') in axial spatial relation to the outer telescoping member (10*a*').

Figure 3:
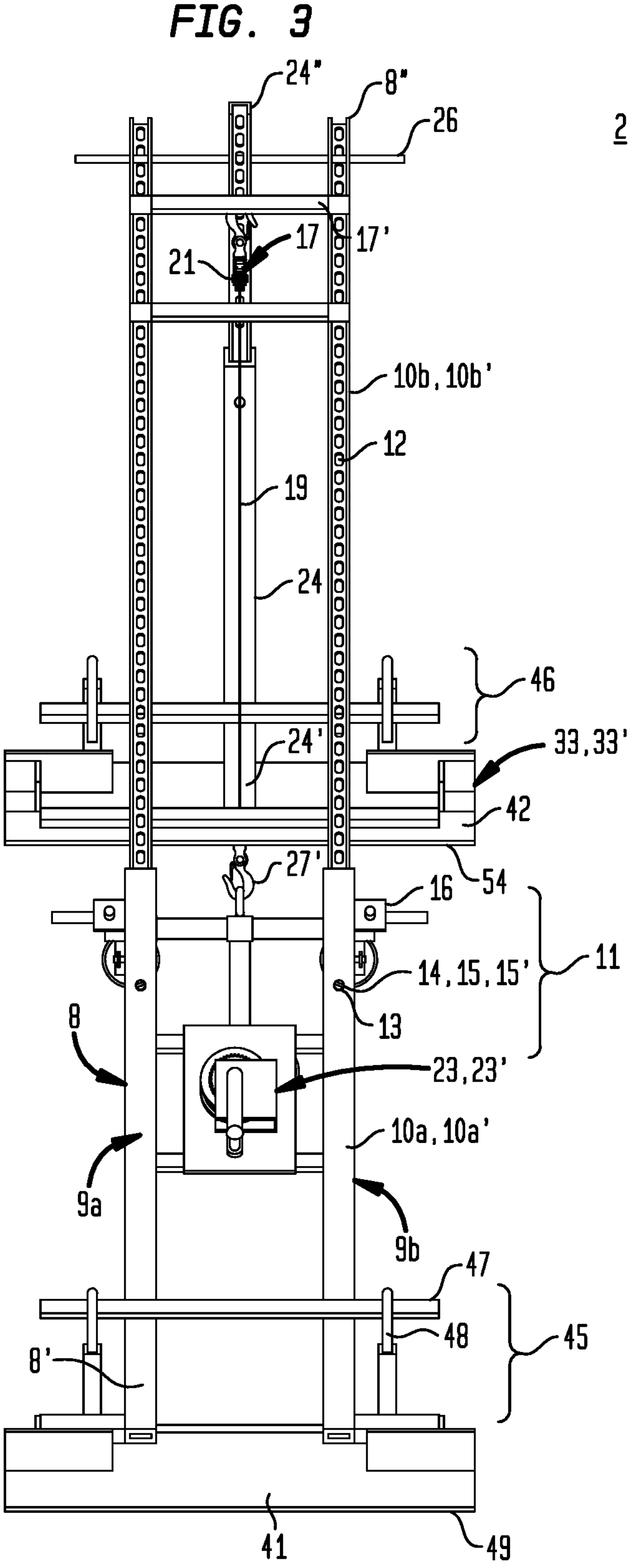
FIG. 3 is a front elevation view of a particular embodiment of the inventive lift.
Figure 4:
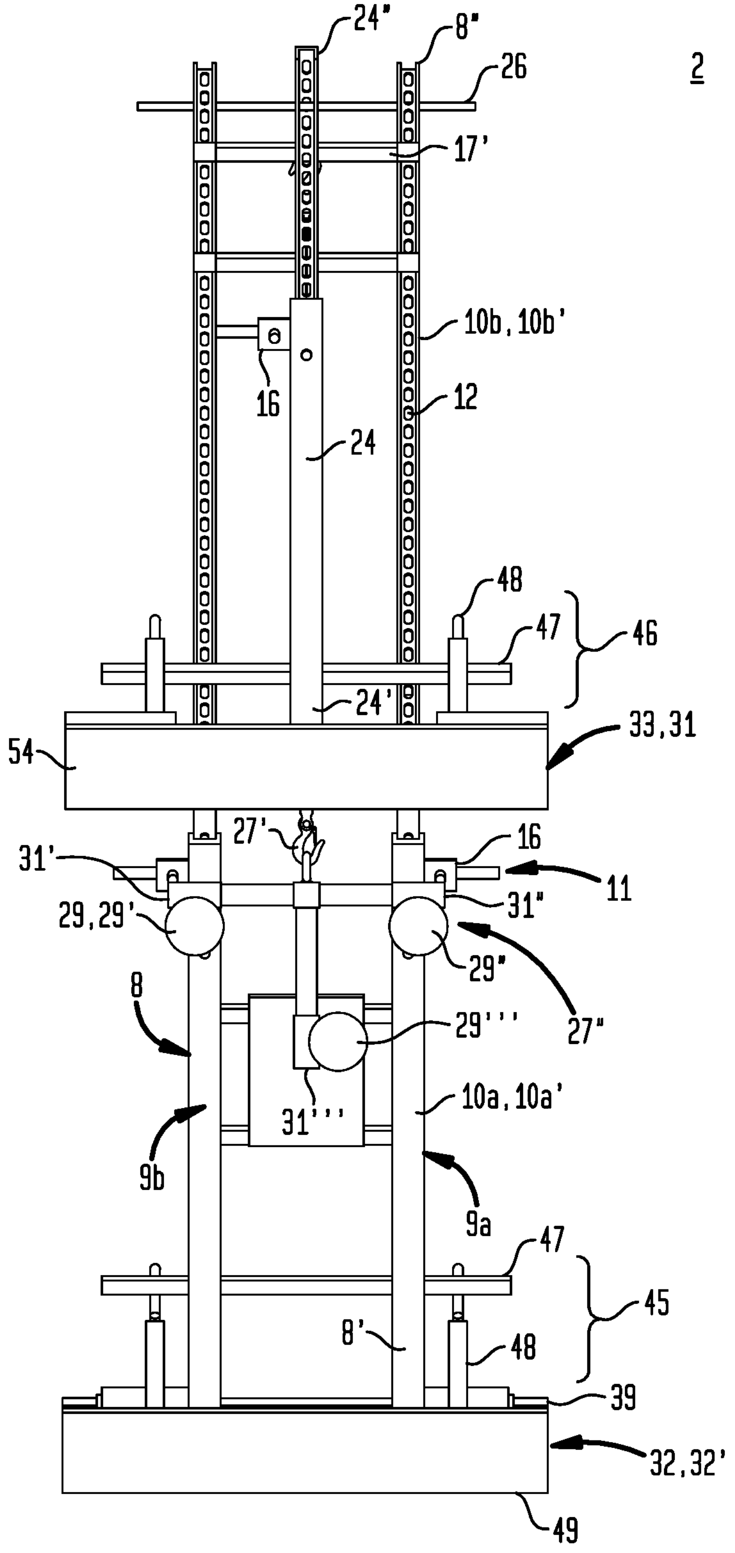
FIG. 4 is a rear elevation view of a particular embodiment of the inventive lift.
Figure 5:
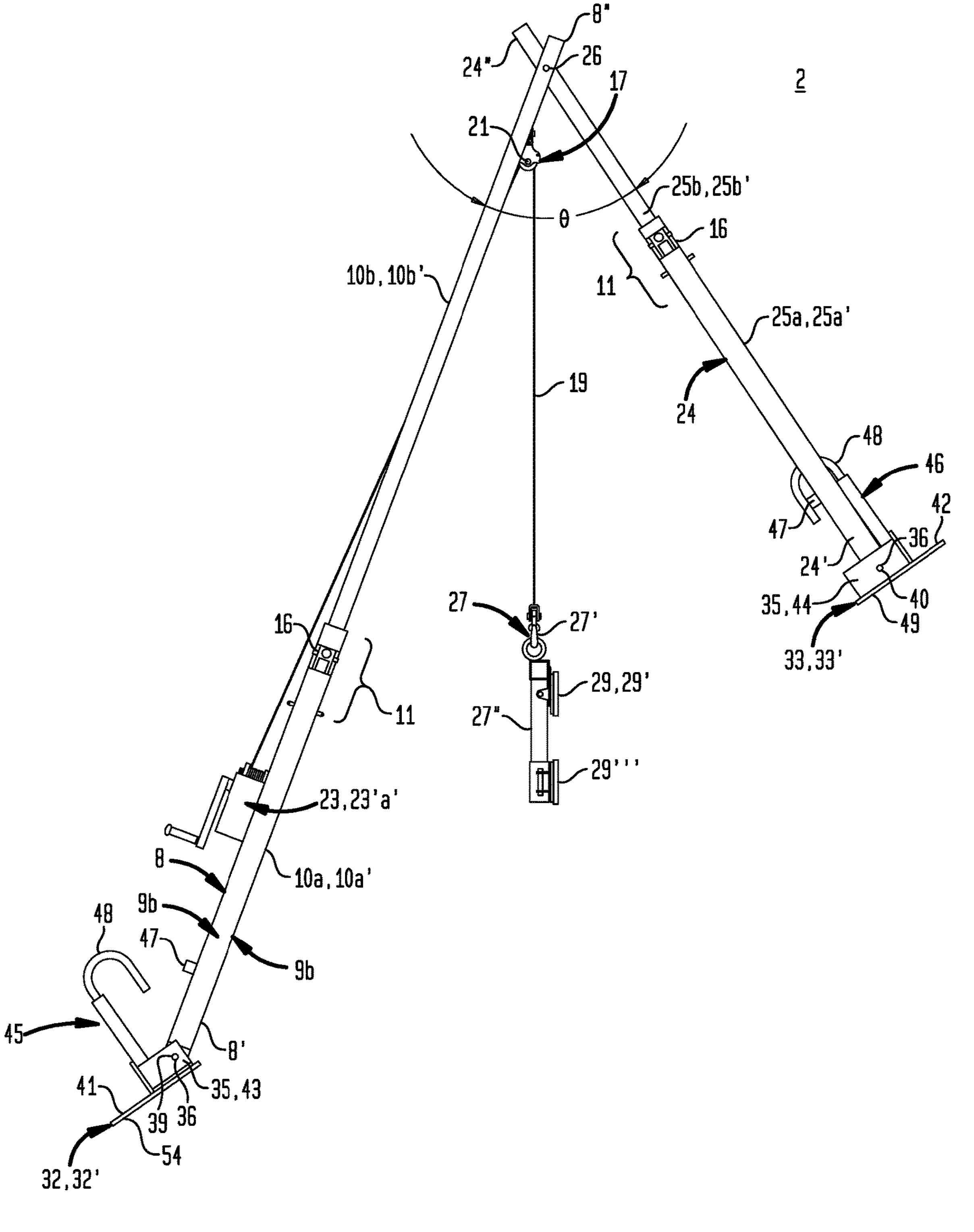
FIG. 5 is a first side elevation view of a particular embodiment of the inventive lift.
Figure 6:
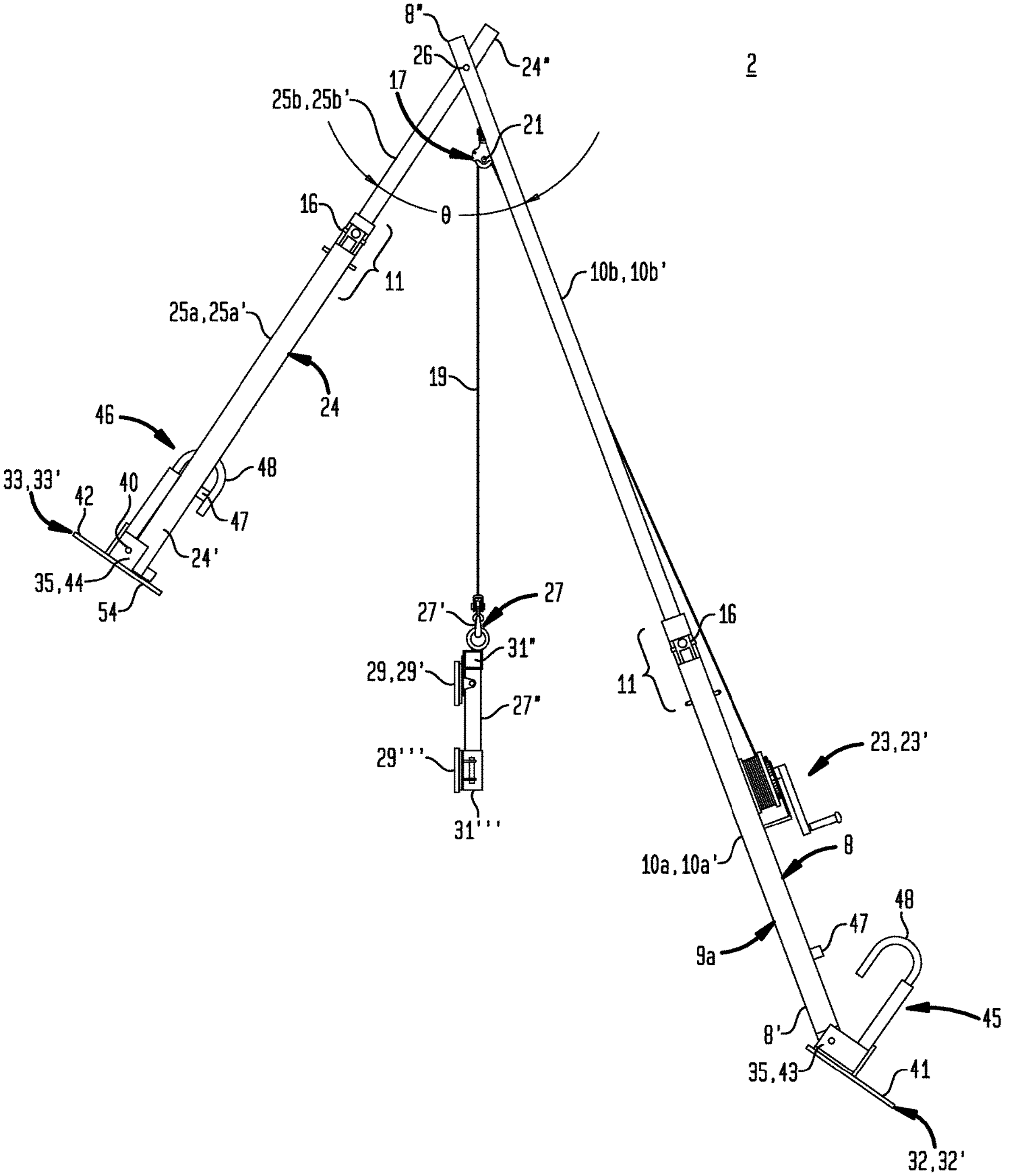
FIG. 6 is a second side elevation view of a particular embodiment of the inventive lift.
Figure 7:
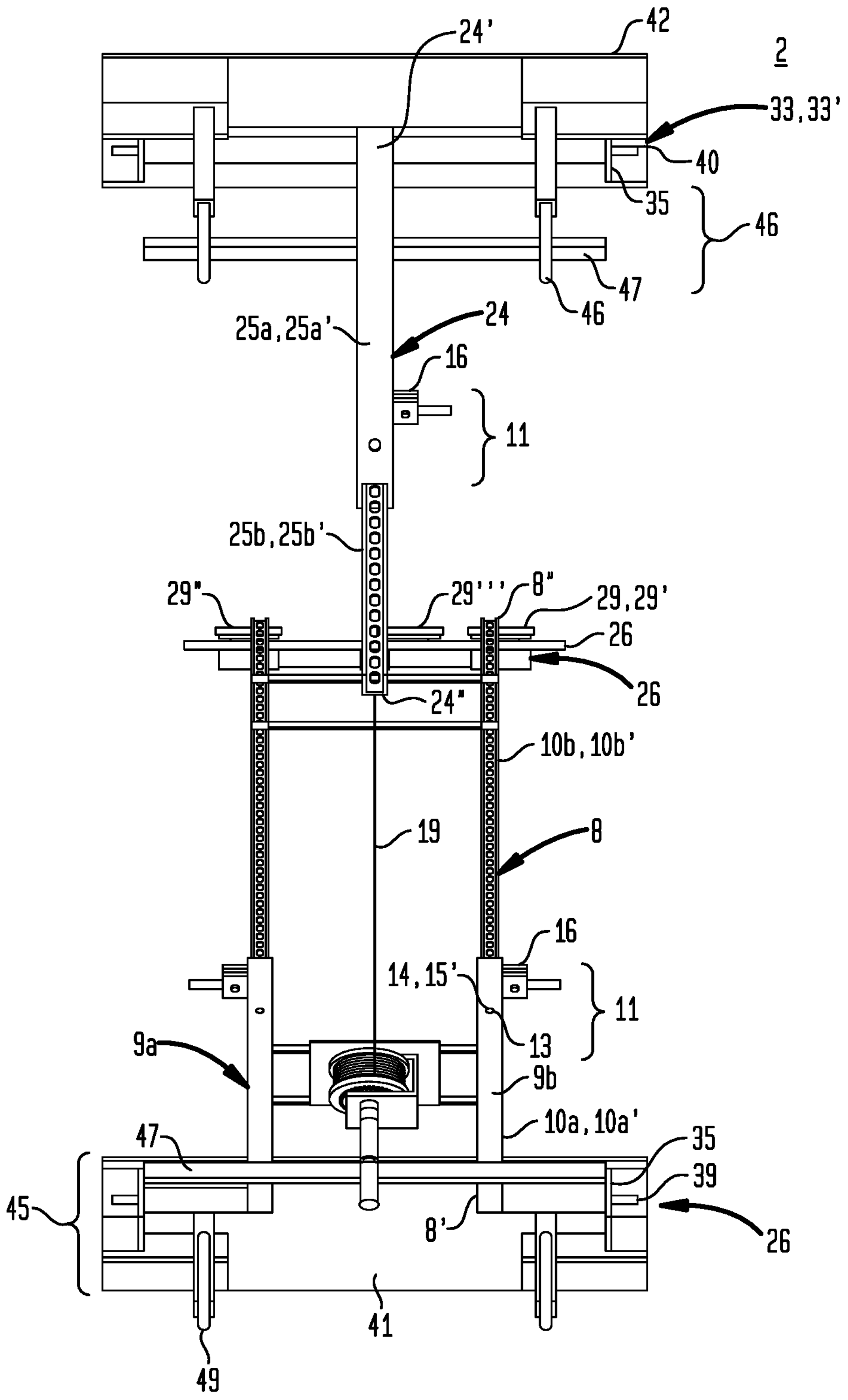
FIG. 7 is a top plan view of a particular embodiment of the inventive lift.

Now, with primary reference to FIGS. 2 through 3, a line pay-out support (17) can be disposed proximate the first length adjustable support second end (8"). The line pay-out support (17) has a configuration which allows a line (19) to change of direction from an orientation along the longitudinal axis (LA1) of the first length adjustable support (8) to a substantially vertical orientation from the line-pay out support (17). When the line (19) attaches to a load (3) it can comprise a movable or mechanical advantage system. In particular embodiments, the line pay-out support (17) may comprise a cross piece (17') disposed proximate the first length adjustable support second end (8") configured to allow the line (19) to move along the change of direction. The cross piece (17') may rotate in a bushing or a roller bearing to reduce friction. In particular embodiments, the line pay-out support (17) can comprise a pully block (21) coupled to the cross piece (17'). The pulley block (21) includes a pully (22) which rotates on an axle or shaft that is designed to support movement and change of direction of the line (19) or point of application of force. As one illustrative example the line pay-out support (17) can comprise a two-ton swiveling hoist block manufactured by Chic Industrial P/N WB2TPBONLY, Model WB2TPBLOCK. In particular embodiments, the line (19) can comprise a cable steel wire, and specifically, can comprise a 3/16" galvanized aircraft cable steel wire rope manufactured by Groove Industrial.

Again, with primary reference to FIGS. 2 through 3, embodiments can further include a line pay-out device (23) coupled to the first length adjustable support (8). In particular embodiments, the line pay-out device (23) can be supported between the pair of length adjustable support members (9*a*, 9*b*) proximate the first length adjustable first end (8'). The line pay-out device (23) can be adapted or configured to engage the line (19) to adjust the line length supported by the line pay-out support (17). In particular embodiments, the line pay-out device (23) can windably engage the line (19) to wind and unwind the line (19) to adjust line length. As an illustrative example, the line pay-out device (23) can comprise a winch (23') (whether manual or electric), and in particular embodiments a brake winch. A winch (23') suitable for use with particular embodiments can be a Goldenrod Dutton-Lainson 14964 DLB1500A Brake Winch.

Now, with primary reference to FIGS. 1 through 8 embodiments can, but need not necessarily, include a second length adjustable support (24) having a second length adjustable support first end (24') opposite a second length adjustable support second end (24"). The second length adjustable support second end (24") can be pivotally coupled to the first length adjustable support second end (8"). The pivotal coupling allows the first length adjustable support (8) to be disposed in adjustable angled relation to the second length adjustable support (24). The angle (0) can be substantially zero degrees allowing for the first length adjustable support (8) and the second length adjustable support (24) to be disposed in substantially adjacent relation, and the angle (0) can be increased toward 180 degrees as necessary to dispose the first length adjustable support first end (8') a desired distance from the second length adjustable support first end (24').

In particular embodiments, the second length adjustable support (24) can comprise one second length adjustable member as shown in the examples of FIGS. 2 and 3; however, this illustrative example is not intended to preclude use of a pair of length adjustable support members disposed in fixed spaced apart relation. The second length adjustable support (24) can include a first member (25*a*) configured to slidably axially adjustable engage a second member (25*b*). As an illustrative example, the second length adjustable member (25) can include an inner telescoping member (25*b*') axially adjustable in an outer telescoping member (25*a*'). This example is not intended to preclude embodiments having a greater number of telescoping members. The inner telescoping member (25*b*') and the outer telescoping member (25*a*') can each in cross section perpendicular to the longitudinal axis (LA2) define a square tube, as shown in the example of FIG. 2; however, this is not intended to preclude configurations which in the cross section perpendicular to the longitudinal axis defines a rectangle, circle, oval, or other cross section configuration in which an inner telescoping member (25*b*') slidably engages the outer telescoping member (25*a*') to allow axial slidably adjustment of the outer telescoping member (25*a*') in relation to the inner telescoping member (25*b*'). In particular embodiments, a lock mechanism (11), as above described for the first length adjustable support (8), can be associated with the inner telescoping member (25*b*') or the outer telescoping member (25*a*') to releasably lock the inner telescoping member (25*b*') in axial relation to the outer telescoping member (25*a*'). The first member (25*a*) and the second member (25*b*) can each be formed from one or more of: a metal, such as: steel, aluminum, magnesium, titanium, beryllium and alloys, or combinations thereof; a fiber glass; or a plastic, or combinations thereof.

In particular embodiments, the second length adjustable support (24) can be uncoupled from the first length adjustable support (8) to allow the first length adjustable support (8) to operated independent from the second length adjustable support (24). In the illustrative embodiment of FIG. 2, a pivot shaft (26) having a pivot axis (PA) about which the first length adjustable support (8) and the second length adjustable support (24) rotate. The pivot shaft (26) can be slidably removed to uncouple the first length adjustable support (8) from the second length adjustable support (24). However, this illustrative example is not intended to preclude the use of other configurations of a pivot to pivotally couple the second length adjustable support second end (24") to the first length adjustable support second end (8").

Now, referring primarily to FIGS. 1 to 8, embodiments can include a load capture assembly (27) attached to the line (19). The load capture assembly (27) can be adapted or configured to couple to any type of load (3) comprising any container, device, or material that attached to the line (19) exerts a force (F). In particular embodiments, the load capture assembly (27) can comprise a hook (27') such as a clevis hook to which be used to attach containers, devices or materials to the line (19).

As shown in the illustrative example of FIG. 1, in particular embodiments the load capture assembly (27) can comprise a panel capture assembly (27"). The panel capture assembly (27") can be adapted to or configured to couple to a panel (28). The term "panel" with respect to embodiments of the invention broadly includes a non-porous material, including as illustrative examples: metal, glass, tile, and fiberglass, or combinations thereof, which non-porous material(s) may also be incorporated or integrated in or be included as component of a product. As one example, a non-porous material can be glass panels (28') discrete from any other structure, or the glass panels (28') may be a component of a skylight product (7).

Again, with primary reference to FIG. 1, in particular embodiments, the panel capture assembly (27") can include one or more vacuum cups (29) coupled to a framework (30) attached to the line (19). Certain embodiments can include a pair of vacuum cups (29', 29") coupled proximate opposite ends of a linear framework member (30'). In particular embodiments the framework (30) can be configured as a T-shape frame (30") with three vacuum cups (29', 29", 29'") coupled proximate each of three ends (31', 31", 31") of the T-shape frame (30"). However, this is not intended to preclude other configurations of the framework (30) supporting the vacuum cups (29) which may be configured to capture panels that may not be planar or flat but may have other three-dimension configurations.

As shown in the illustrative example of FIG. 1, the length of the line (19) can be adjusted by operation of the line pay-out device (23) to raise or lower the load (3) and particularly a panel (28) coupled to the panel capture assembly (27").

Now, with primary reference to FIGS. 2 through 8, embodiments can include a first mount (32) and/or a second mount (33) configured to respective secure the first length adjustable support first end (8') and/or second length adjustable support first end (24') in fixed spatial relation to a surface (34). In particular embodiments, the first mount (32) and the second mount (33) can be removably coupled to of the first length adjustable support first end (8') and/or second length adjustable support first end (24'). In these embodiments, the first mount (32) and/or the second mount (33) can be secured in fixed spatial relation to a surface (34) and the first length adjustable support first end (8') and/or the second length adjustable support first end (24') can be correspondingly engaged or secured in fixed spatial relation to the first mount (32) and/or the second mount (33). As one example, the first mount (32) and the second mount (33) can include pivot brackets (35) having pivot bracket apertures (36) alignable with first length adjustable support first end pivot apertures (37) and/or the second length adjustable support first end pivot apertures (38) and a first mount pivot (39) and/or a second mount pivot (40) can be received in or removed from the aligned apertures (36, 37 or 36, 38). Thus, whether the first mount (32) and the second mount (33) remain rotatably fixed or removable to the first length adjustable support first end (8') or the second length adjustable support first end (24'), embodiments can include a first rotatable mount (32') coupled to the of the first length adjustable support first end (8') and/or a second rotatable mount (33') can be coupled to the second length adjustable support first end (24').

However, the above illustrative examples are not intended to preclude other embodiments and depending upon the configuration of the first length adjustable support first end (8') and/or the second length adjustable support first end (24'), the first mount top surface (41) and the second mount top surface (42) can vary in configuration to secure the respective first length adjustable support first end (8') and/or the second length adjustable support first end (24'). In the illustrative example of FIG. 2, the first and second mount top surfaces (41, 42) have upwardly extending flanges (43, 44) that preclude axial and lateral travel of the first length adjustable support first end (8') and the second length adjustable support first end (24') in relation to the first mount (32) and the second mount (33). In particular embodiments, the first mount (32) and the second mount (33) can respectively include a catch assembly (45, 46). As shown in the illustrative example of FIGS. 2 and 3, each catch assembly (45, 46) can include a cross member (47) affixed proximate the first length adjustable support first end (8') and/or the second length adjustable support first end (24'). A cross member catch (48) can be coupled to the first mount (32) or the second mount (33). The cross member catch (48) can be configured to engage the cross member (47) to secure the first length adjustable support (8) and/or the second length adjustable support (24) to the respective first mount (32) and/or the second mount (33).

Figure 8:
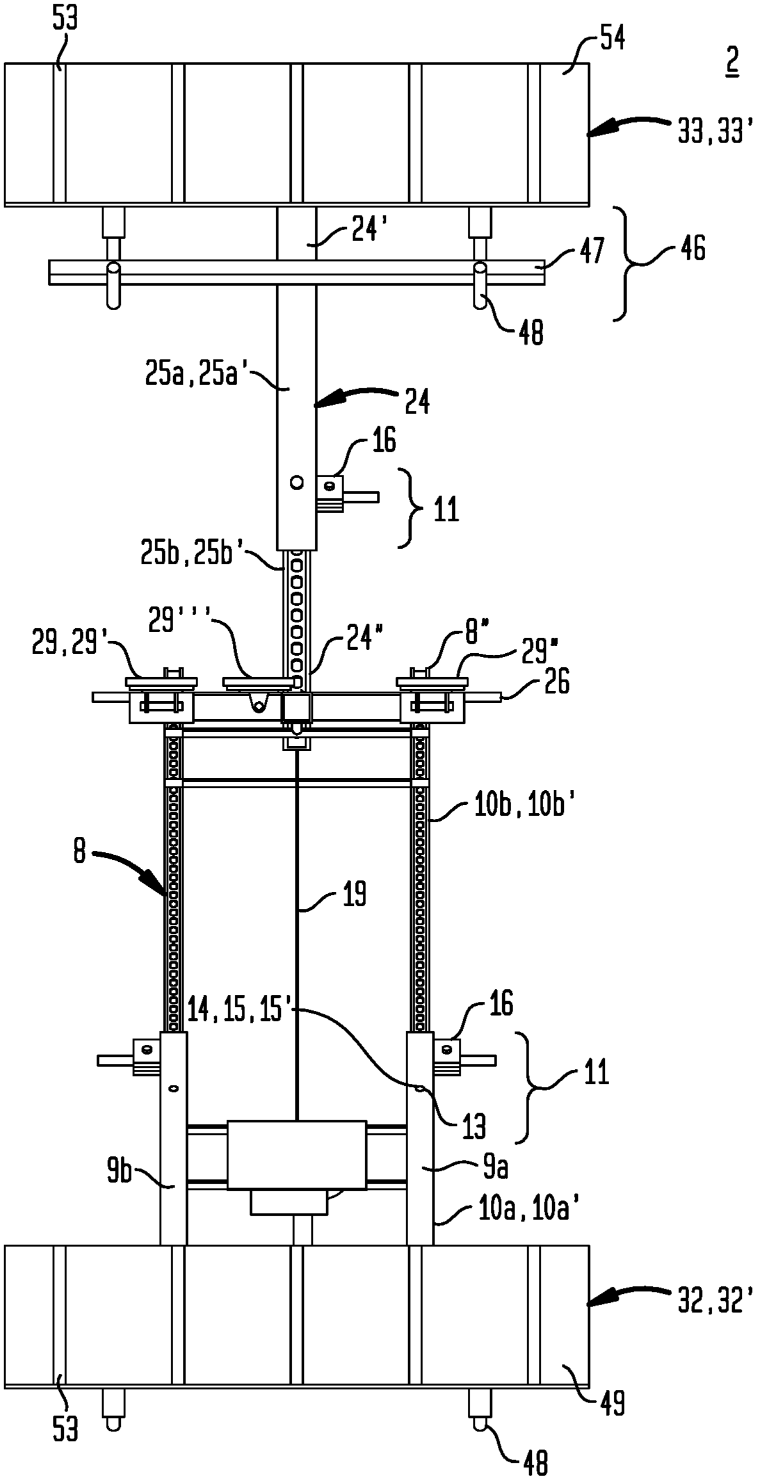
FIG. 8 is a bottom plan view of a particular embodiment of the inventive lift.

Now, with primary reference to FIG. 8, the first and second mount bottom surface (49) can be substantially flat or substantially planar to affix to correspondingly flat or planar surface (34). As one illustrative example, the flat or planar surface (34) can comprise roof decking or roof sheathing (50) of a roof (51). As another illustrative example, the mount bottom surface (49) can be configured to lay on top of an existing roof covering (51) the roof decking or roof sheathing (50) where the roof (51) has a three-dimensional profile. For example, a metal roof can have outwardly extending spaced apart ribs which would be damaged by a flat mount bottom surface (49). Accordingly, the mount bottom surface (49) can have corresponding recesses (53) to receive the ribs to reduce or minimize damage to the roof (51) covering the roof decking (50).

Now, with primary reference to FIG. 1, the first mount (32) and the second mount (33) can be secured to a horizontal surface or secured to an inclined surface (34) (a surface that that deviates from a horizontal surface). In the illustrative example, the first and second mount (23, 24) can be fastened to an inclined surface (34). The inclined surface (34) can be any inclined surface, but the lift (2) may be particularly useful when secured to an inclined roof surface (34) to move a load (3) to the roof (51). In a particular example, the load (3) can be glass panels (28') for installation in a roof opening (52) as a skylight (7) or can be fully assembled skylights (7) for installation in the roof opening (52). However, the lift (2) can be used to move any material through the roof opening (52) including tools or any building materials, such as: roof sheathing, underlayment, roof tiles, shingles, flashing, solar panels, or combinations thereof.

Again, with primary reference to FIG. 1, a method of using the lift system (1) or a lift (2) comprises one or more of disposing the lift (2) on a surface (34), including one or more of: securing a first mount (32) to the surface (34) and securing a second mount (33) to the surface (34). The method can further include pivotally rotating the second length adjustable support (24) in relation to said first length adjustable support (8). The method can further include adjusting length of the first length adjustable support (8) of the lift (2) and/or adjusting the length of the second length adjustable support (24). The method can further include securing the first length adjustable support first end (8') to the first mount (32) and securing the second length adjustable support first end (24') to the second mount (33). The method can further include operating a line pay-out device (23) coupled the first length adjustable support (8) to adjust a length of a line (19) supported by a line pay-out support (17) disposed proximate the first length adjustable support second end (8"). The method can further include securing a load (20) to the line, and optionally capturing a panel (28) with a panel capture assembly (27"). The method can further include lifting the load (3), optionally, the panel (28) captured by said panel capture assembly (27"), by operation of the line pay-out device (23).

As can be easily understood from the foregoing, the basic concepts of the present invention may be embodied in a variety of ways. The invention involves numerous and varied embodiments of the lift system (1) a lift (2) and methods for making and using such lift system (1) or lift (2) including the best mode.

As such, the particular embodiments or elements of the invention disclosed by the description or shown in the figures or tables accompanying this application are not intended to be limiting, but rather exemplary of the numerous and varied embodiments generically encompassed by the invention or equivalents encompassed with respect to any particular element thereof. In addition, the specific description of a single embodiment or element of the invention may not explicitly describe all embodiments or elements possible; many alternatives are implicitly disclosed by the description and figures.

It should be understood that each element of an apparatus or each step of a method may be described by an apparatus term or method term. Such terms can be substituted where desired to make explicit the implicitly broad coverage to which this invention is entitled. As but one example, it should be understood that all steps of a method may be disclosed as an action, a means for taking that action, or as an element which causes that action. Similarly, each element of an apparatus may be disclosed as the physical element or the action which that physical element facilitates. As but one example, the disclosure of a "lift" should be understood to encompass disclosure of the act of "lifting"—whether explicitly discussed or not—and, conversely, were there is a disclosure of the act of "lifting", such a disclosure should be understood to encompass disclosure of a "lift" and even a "means for lifting". Such alternative terms for each element or step are to be understood to be explicitly included in the description.

In addition, as to each term used it should be understood that unless its utilization in this application is inconsistent with such interpretation, common dictionary definitions should be understood to be included in the description for each term as contained in the Random House Webster's Unabridged Dictionary, second edition, each definition hereby incorporated by reference.

All numeric values herein are assumed to be modified by the term "about", whether or not explicitly indicated. For the purposes of the present invention, ranges may be expressed as from "about" one particular value to "about" another particular value. When such a range is expressed, another embodiment includes from the one particular value to the other particular value. The recitation of numerical ranges by endpoints includes all the numeric values subsumed within that range. A numerical range of one to five includes for example the numeric values 1, 1.5, 2, 2.75, 3, 3.80, 4, 5, and so forth. It will be further understood that the endpoints of each of the ranges are significant both in relation to the other endpoint, and independently of the other endpoint. When a value is expressed as an approximation by use of the antecedent "about," it will be understood that the particular value forms another embodiment. The term "about" generally refers to a range of numeric values that one of skill in the art would consider equivalent to the recited numeric value or having the same function or result. Similarly, the antecedent "substantially" means largely, but not wholly, the same form, manner or degree and the particular element will have a range of configurations as a person of ordinary skill in the art would consider as having the same function or result. When a particular element is expressed as an approximation by use of the antecedent "substantially," it will be understood that the particular element forms another embodiment.

Moreover, for the purposes of the present invention, the term "a" or "an" entity refers to one or more of that entity unless otherwise limited. As such, the terms "a" or "an", "one or more" and "at least one" can be used interchangeably herein.

Further, for the purposes of the present invention, the term "coupled" or derivatives thereof can mean indirectly coupled, coupled, directly coupled, connected, directly connected, or integrated with, depending upon the embodiment.

Additionally, for the purposes of the present invention, the term "integrated" when referring to two or more components means that the components (i) can be united to provide a one-piece construct, a monolithic construct, or a unified whole, or (ii) can be formed as a one-piece construct, a monolithic construct, or a unified whole. Said another way, the components can be integrally formed, meaning connected together so as to make up a single complete piece or unit, or so as to work together as a single complete piece or unit, and so as to be incapable of being easily dismantled without destroying the integrity of the piece or unit.

Thus, the applicant(s) should be understood to claim at least: i) each of the lift herein disclosed and described, ii) the related methods disclosed and described, iii) similar, equivalent, and even implicit variations of each of these devices and methods, iv) those alternative embodiments which accomplish each of the functions shown, disclosed, or described, v) those alternative designs and methods which accomplish each of the functions shown as are implicit to accomplish that which is disclosed and described, vi) each feature, component, and step shown as separate and independent inventions, vii) the applications enhanced by the various systems or components disclosed, viii) the resulting products produced by such systems or components, ix) methods and apparatuses substantially as described hereinbefore and with reference to any of the accompanying examples, x) the various combinations and permutations of each of the previous elements disclosed.

The background section of this patent application, if any, provides a statement of the field of endeavor to which the invention pertains. This section may also incorporate or contain paraphrasing of certain United States patents, patent applications, publications, or subject matter of the claimed invention useful in relating information, problems, or concerns about the state of technology to which the invention is drawn toward. It is not intended that any United States patent, patent application, publication, statement or other information cited or incorporated herein be interpreted, construed or deemed to be admitted as prior art with respect to the invention.

The claims set forth in this specification, if any, are hereby incorporated by reference as part of this description of the invention, and the applicant expressly reserves the right to use all of or a portion of such incorporated content of such claims as additional description to support any of or all of the claims or any element or component thereof, and the applicant further expressly reserves the right to move any portion of or all of the incorporated content of such claims or any element or component thereof from the description into the claims or vice-versa as necessary to define the matter for which protection is sought by this application or by any subsequent application or continuation, division, or continuation-in-part application thereof, or to obtain any benefit of, reduction in fees pursuant to, or to comply with the patent laws, rules, or regulations of any country or treaty, and such content incorporated by reference shall survive during the entire pendency of this application including any subsequent continuation, division, or continuation-in-part application thereof or any reissue or extension thereon. The elements following an open transitional phrase such as "comprising" may in the alternative be claimed with a closed transitional phrase such as "consisting essentially of" or "consisting of" whether or not explicitly indicated the description portion of the specification.

Additionally, the claims set forth in this specification, if any, are further intended to describe the metes and bounds of a limited number of the preferred embodiments of the invention and are not to be construed as the broadest embodiment of the invention or a complete listing of embodiments of the invention that may be claimed. The applicant does not waive any right to develop further claims based upon the description set forth above as a part of any continuation, division, or continuation-in-part, or similar application.

I claim:

1. A lift, comprising:

a first length adjustable support having a first end opposite a second end, said first length adjustable support comprising a pair of length adjustable support members disposed in fixed spaced apart relation, said first end of said first length adjustable support having a first mount configured to secure to a surface;

a line pay-out support disposed proximate said second end of said first length adjustable support;

a second length adjustable support having a first end opposite a second end, said first end of said second length adjustable support having a second mount configured to secure to a surface of a structure, said second end of said second length adjustable support pivotally coupled to said second end of said first length adjustable support;

a line pay-out device coupled to said first length adjustable support, said line pay-out device operable to adjust a length of a line supported by said line pay-out support disposed proximate said second end of said first length adjustable support; and a load capture assembly attached to said line, said length of said line adjustable by operation of said line pay-out device to lift a load coupled to said load capture assembly.

2. The lift of claim 1, wherein said surface of said structure comprises an inclined surface.

3. The lift of claim 2, wherein said inclined surface comprises an inclined roof of a building.

4. The lift of claim 1, wherein said load capture assembly comprises a panel capture assembly configured to capture a non-porous material.

5. The lift of claim 4, wherein said non-porous material comprises one or more of glass, tile, fiberglass, or metal.

6. The lift of claim 5, wherein said non-porous material comprises glass of a skylight.

7. The lift of claim 4, wherein said panel capture assembly comprises one or more vacuum cups.

8. The lift of claim 7, wherein said one or more vacuum cups coupled proximate opposite ends of a linear frame member.

9. The lift of claim 7, wherein said one more vacuum cups coupled proximate three ends of a T-shape frame.

10. The lift of claim 1, wherein said pair of length adjustable support members each comprise an inner telescoping member axially adjustable in an outer telescoping member.

11. The lift of claim 1, wherein said second length adjustable support comprises one length adjustable support member.

12. The lift of claim 11, wherein said one length adjustable support member comprises an inner telescoping member axially adjustable in an outer telescoping member.

13. The lift of claim 12, further comprising a lock mechanism operable to releasably lock said inner telescoping member in axial relation to said outer telescoping member.

14. The lift of claim 13, wherein said locking mechanism comprises a spring detent positioned in said inner telescoping member and extending through an aperture therein, wherein said outer telescoping member having one or more apertures configured to receive a button of said spring detent.

15. The lift of claim 13, wherein said lock mechanism comprises a cam member pivotally coupled to said outer telescoping member, said cam member rotates through an opening in said outer telescoping member to apply urging pressure to said inner telescoping member.

16. The lift of claim 13, wherein said locking mechanism comprises a plurality of apertures in said inner telescoping member axially alignable with a plurality of apertures in said outer telescoping member, and a pin removably insertable into a pair of aligned apertures.

17. The lift of claim 1, wherein said line pay-out device is supported between said pair of length adjustable support members.

* * * * *